(12) United States Patent
He et al.

(10) Patent No.: US 7,723,989 B2
(45) Date of Patent: May 25, 2010

(54) TRANSDUCER ASSEMBLIES FOR SUBSURFACE USE

(75) Inventors: Qingyan He, Pearland, TX (US); Chris Del Campo, Houston, TX (US); Richard Dan Ward, La Porte, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 462 days.

(21) Appl. No.: 11/848,441

(22) Filed: Sep. 18, 2007

(65) Prior Publication Data

US 2009/0072832 A1 Mar. 19, 2009

(51) Int. Cl.
*G01V 3/18* (2006.01)
(52) U.S. Cl. .................... 324/324; 324/369; 324/338
(58) Field of Classification Search .................. None
See application file for complete search history.

(56) References Cited

U.S. PATENT DOCUMENTS

| | | | | |
|---|---|---|---|---|
| 3,279,249 | A * | 10/1966 | Tocanne | ................ 73/152.31 |
| 4,320,224 | A | 3/1982 | Rose et al. | |
| 4,738,812 | A | 4/1988 | Raynal | |
| 4,873,488 | A | 10/1989 | Barber et al. | |
| 4,949,045 | A | 8/1990 | Clark et al. | |
| 5,944,124 | A | 8/1999 | Pomerleau et al. | |
| 5,988,300 | A | 11/1999 | Pomerleau et al. | |
| 6,084,052 | A | 7/2000 | Aufdermarsh et al. | |
| 6,299,639 | B1 * | 10/2001 | Castro et al. | ............... 623/1.47 |
| 6,300,762 | B1 | 10/2001 | Thomas, Jr. et al. | |
| 6,566,881 | B2 * | 5/2003 | Omeragic et al. | ........... 324/338 |
| 6,577,244 | B1 | 6/2003 | Clark et al. | |
| 6,710,600 | B1 | 3/2004 | Kopecki et al. | |
| 6,788,263 | B2 * | 9/2004 | Clark et al. | ................. 343/719 |
| 7,023,212 | B2 | 4/2006 | Chen et al. | |
| 7,026,813 | B2 | 4/2006 | Homan et al. | |
| 7,042,225 | B2 | 5/2006 | Barber | |
| 2004/0065437 | A1 | 4/2004 | Bostick, III et al. | |
| 2005/0150655 | A1 | 7/2005 | Duong et al. | |
| 2005/0150713 | A1 | 7/2005 | Garcia-Osuna et al. | |
| 2005/0152219 | A1 | 7/2005 | Garcia-Osuna et al. | |
| 2005/0218898 | A1 * | 10/2005 | Fredette et al. | ............. 324/342 |
| 2007/0062274 | A1 | 3/2007 | Chikenji et al. | |
| 2007/0107896 | A1 | 5/2007 | Finci et al. | |

FOREIGN PATENT DOCUMENTS

| EP | 1598519 | 11/2005 |
|---|---|---|
| GB | 2420624 | 5/2006 |

* cited by examiner

*Primary Examiner*—Jay M Patidar
(74) *Attorney, Agent, or Firm*—Kevin McEnaney; Jonna Flores; Darla Fonseca

(57) ABSTRACT

Transducer apparatus for subsurface use. A tubular configured for subsurface disposal is equipped with a cylindrical transducer module formed of a non-conductive material. The module is mounted to surround a section of the tubular and includes a transducer element disposed thereon such that only a surface of the element is exposed along the exterior of the module body. The transducer element is linked to a lead routed through the cylindrical body to exit near the inner bore of the body. The ends of the cylindrical body are covered with a material to form a hydraulic seal. A method for constructing the transducer apparatus.

22 Claims, 5 Drawing Sheets

100 ↘

```
┌─────────────────────────────────────────────┐
│ DISPOSE A TRANSDUCER ELEMENT ON A CYLINDRICAL BODY │
│ FORMED OF A NON-CONDUCTIVE MATERIAL, THE ELEMENT │
│ DISPOSED WITH AN EXPOSED SURFACE ALONG THE BODY │──105
│ EXTERIOR AND LINKED TO A LEAD ROUTED TO EXIT THE │
│ BODY NEAR THE INNER BORE │
└─────────────────────────────────────────────┘
                      │
┌─────────────────────────────────────────────┐
│ DISPOSE THE CYLINDRICAL BODY ON A TUBULAR FOR │
│ SUBSURFACE DISPOSAL, THE TUBULAR PASSING THROUGH │──110
│ THE CYLINDRICAL BODY BORE SUCH THAT THE BODY │
│ SURROUNDS A SECTION OF THE TUBULAR │
└─────────────────────────────────────────────┘
                      │
┌─────────────────────────────────────────────┐
│ COVER THE ENDS OF THE CYLINDRICAL BODY WITH A │──115
│ MATERIAL TO FORM A HYDRAULIC SEAL │
└─────────────────────────────────────────────┘
```

FIG. 8

TRANSDUCER ASSEMBLIES FOR SUBSURFACE USE

BACKGROUND

1. Technical Field

This invention relates generally to apparatus adapted for subsurface disposal, and, in particular, to source and sensor assemblies for such apparatus.

2. Description of Related Art

Exploration, production, and monitoring of hydrocarbon and water deposits entails the measurement of subsurface characteristics and the evaluation of the obtained data to determine petrophysical properties of interest for the relevant formation or reservoir. These techniques typically employ logging instruments consisting of an elongated tubular or "mandrel" equipped with sources adapted to emit energy through a borehole traversing the subsurface formation. The emitted energy interacts with the borehole fluid ("mud") and/ or the surrounding formation to produce signals that are detected and measured by one or more sensors on the instrument. By processing the detected signal data, a profile or "log" of the formation properties is obtained.

Logging techniques known in the art employ various forms of conveyance for respectively deploying and retrieving the instruments to/from subsurface formations. Among the various logging techniques, two forms of conveyance are routinely employed—wireline and while-drilling logging systems. Wireline logging entails lowering the instrument into the borehole at the end of an armored electrical cable to obtain the subsurface measurements as the instrument is moved along the borehole. Logging-While-Drilling entails disposing the instrument in a drilling assembly for use while a borehole is drilled through the formations.

Conventional electromagnetic (EM) logging instruments are implemented with antennas that are operable as sources and/or sensors. In operation, a transmitter antenna is energized by an alternating current to emit EM energy which interacts with the formation and a corresponding EM signal is received at a receiver antenna. U.S. Pat. No. 6,788,263 describes systems for EM logging. Some logging instruments are implemented with acoustic sources and sensors to obtain the measurements using acoustic energy. U.S. Patent Publication Nos. 20050150655, 20050150713 and 20050152219 describe systems for acoustic logging. Other logging instruments are implemented with sensors configured for spherically focused log (SFL) measurements. U.S. Pat. No. 7,042,225 describes systems for SFL logging.

FIG. 1 shows a conventional sensor 10 mounted on a tubular 12, such as the mandrel of a wireline instrument. The sensor 10 includes an exposed electrode 16 that comes into contact with the borehole fluid when the instrument is deployed in a borehole. FIG. 2 shows a cross-sectional view of the sensor 10 configuration of FIG. 1. As shown, the electrode 16 is disposed over an insulation layer 18 and held in place by an outer layer 20, which may be formed from a composite material. In this design, the connecting wire 22 from the electrode 16 has to go through the insulation layer 18 in order to make the electrical connection with an internal component 24. Due to the space constraints typically imposed on the instruments, the thickness of the insulation layer 18 is often smaller than desired for forming a good seal for the wire 22 under downhole pressure. The slim tubular 12 designs also have the problem of bending and poor eccentricity that affects the actual thickness of the layer 18. These drawbacks of conventional designs are among the causes for failures of the sensor 10 under the pressures experienced when the instrument is disposed downhole.

As logging systems continue to evolve with highly integrated tools, the sources and sensors are often exposed to downhole fluids, and wires from these components have to be connected to internally housed electronics that cannot be wet or contaminated by the downhole fluids. Thus a need remains for improved techniques to implement tools with sources and sensors for subsurface use.

SUMMARY

One aspect of the invention provides a transducer apparatus for subsurface use. The apparatus including a tubular configured for subsurface disposal; a cylindrical body having an inner bore and formed of a non-conductive material; the tubular being disposed within the inner bore of the cylindrical body such that the body surrounds a section of the tubular; the cylindrical body having a transducer element disposed thereon such that only a surface of the element is exposed along the exterior of the body; the transducer element being linked to a lead routed through the cylindrical body and exiting near the inner bore of the body; and the ends of the cylindrical body being covered with a material to form a hydraulic seal.

Another aspect of the invention provides a method for constructing a transducer apparatus for subsurface use. The method includes disposing a transducer element on a cylindrical body having an inner bore and formed of a non-conductive material, the element disposed such that only a surface of the element is exposed along the exterior of the body and linked to a lead routed through the body to exit near the inner bore of the body; disposing the cylindrical body on a tubular configured for subsurface disposal, the tubular passing through the inner bore of the body such that the body surrounds a section of the tubular; and covering the ends of the cylindrical body with a material to form a hydraulic seal.

Another aspect of the invention provides a transducer system for subsurface use. The system including a tubular configured for subsurface disposal; a cylindrical body formed of a non-conductive material having walls and an inner bore forming a single closed surface of revolution with open ends; the cylindrical body having a transducer element disposed thereon such that only a surface of the element is exposed along the exterior of the body, the exposed element surface being recessed from the outer surface of the body; the cylindrical body formed with its ends having reduced outer diameters compared to the main body outer diameter such that each end comprises a lip; the transducer element linked to a lead routed through the cylindrical body and exiting near the inner bore of the body; the tubular disposed within the inner bore of the cylindrical body such that the body surrounds a section of the tubular; a connector disposed on the tubular to couple with the lead for signal or power transmission between the element and remote electronics; and at least one layer of a non-conductive material disposed on the outer surface of the tubular over the lip at each end of the cylindrical body to form a hydraulic seal.

BRIEF DESCRIPTION OF THE DRAWINGS

Other aspects and advantages of the invention will become apparent upon reading the following detailed description and upon reference to the drawings in which like elements have been given like numerals and wherein:

FIG. 8 is a flow chart of a method for constructing a transducer apparatus for subsurface use in accord with aspects of the invention.

DETAILED DESCRIPTION

For purposes of this disclosure, the term "sensor" is understood to comprise any device or element adapted to receive/detect energy (e.g., EM or acoustic energy) or generate a signal in response to contact/exposure with a gas or fluid (e.g., a fluid sensor). Similarly, the term "source" is understood to comprise any device or element adapted to transmit/emit energy (e.g., EM or acoustic energy). As known in the art, transducer devices convert input energy of one form into output energy of another. An example of a transducer is a piezoelectric crystal, which converts energy between electric and acoustic forms. Such transducer elements are routinely adapted to act as sources or sensors. For purposes of this disclosure, the term "transducer" is understood to comprise any device or element that is configured or can be adapted to act as a source and/or a sensor as known in the art.

Figure 1:
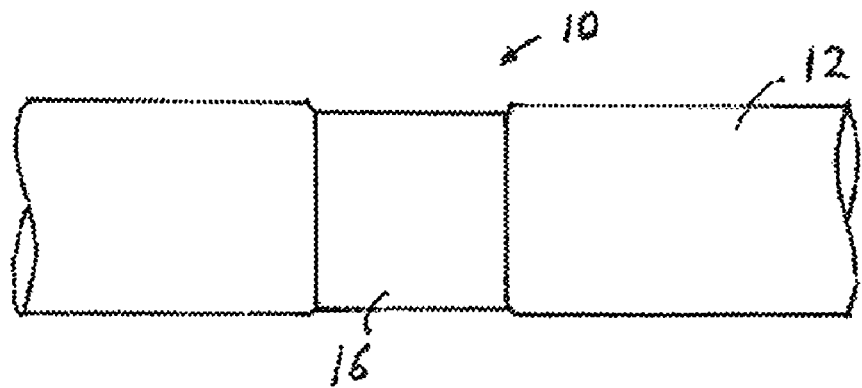
FIG. 1 is a schematic of a conventional sensor mounted on a mandrel.
Figure 2:
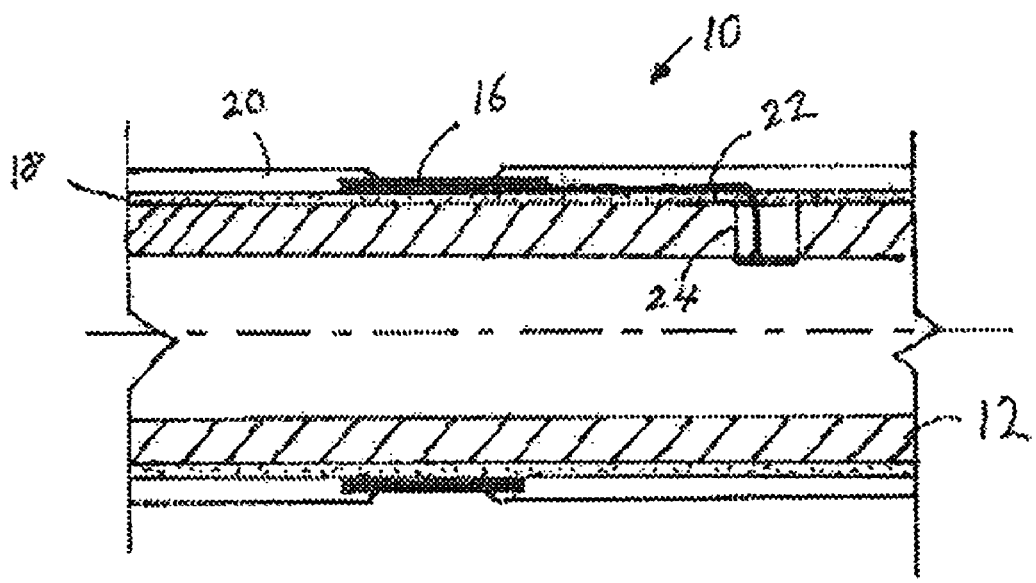
FIG. 2 is a cross-section side view of the sensor configuration of FIG. 1.
Figure 3:
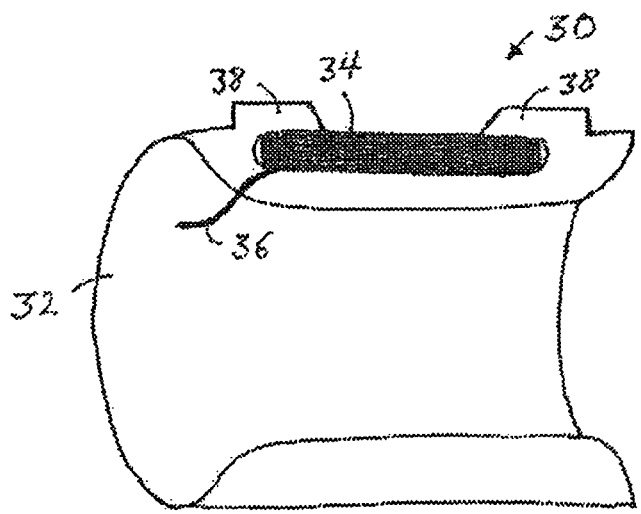
FIG. 3 is a cross-section side view of a transducer module in accord with aspects of the invention.

FIG. 3 shows a cross-sectional perspective of a transducer module 30 of the invention. A cylindrical body 32 is shown with a transducer element 34 disposed thereon. Though shown in partial view for clarity of explanation, the body 32 is formed as a single closed surface of revolution with elongated walls and an inner bore. The body 32 is preferably made of a non-conductive material. Useable materials include rubber, commercial thermal plastics such as PEK™, PEEK™, PEKK™, ULTRAPEK™, composites of these materials, and other materials that can withstand the conditions expected for a downhole tool as known in the art (e.g., as described in U.S. Pat. Nos. 4,320,224 and 6,084,052).

The transducer element 34 can be any suitable element used for subsurface measurements as known in art. Some aspects are implemented with transducer elements 34 designed to function by having a surface directly exposed to the environment. Such elements 34 include acoustic transducers, SFL electrodes, and others as known in the art. In an aspect of the invention, the transducer element 34 is molded and sealed inside the body 32 such that only a partial surface of the element is exposed along the exterior of the body. A lead 36 is linked to the element 34 and routed such that it comes out at, or near, an end of the body 32 and near the inner diameter surface of the body. Depending on the type of element 34 and the desired application, the lead(s) 36 may consist of twisted wire, optical fiber, wire mesh, a single conducting wire, or any other signal/energy transfer medium known in the art. The internal connection(s) between the lead(s) 36 and the element 34 may also be implemented in any suitable manner as known in the art (e.g., soldering, adhesives, etc.).

The transducer module 30 is fabricated such that it is capable of providing a hydraulic seal along the lead 36.

Figure 7:
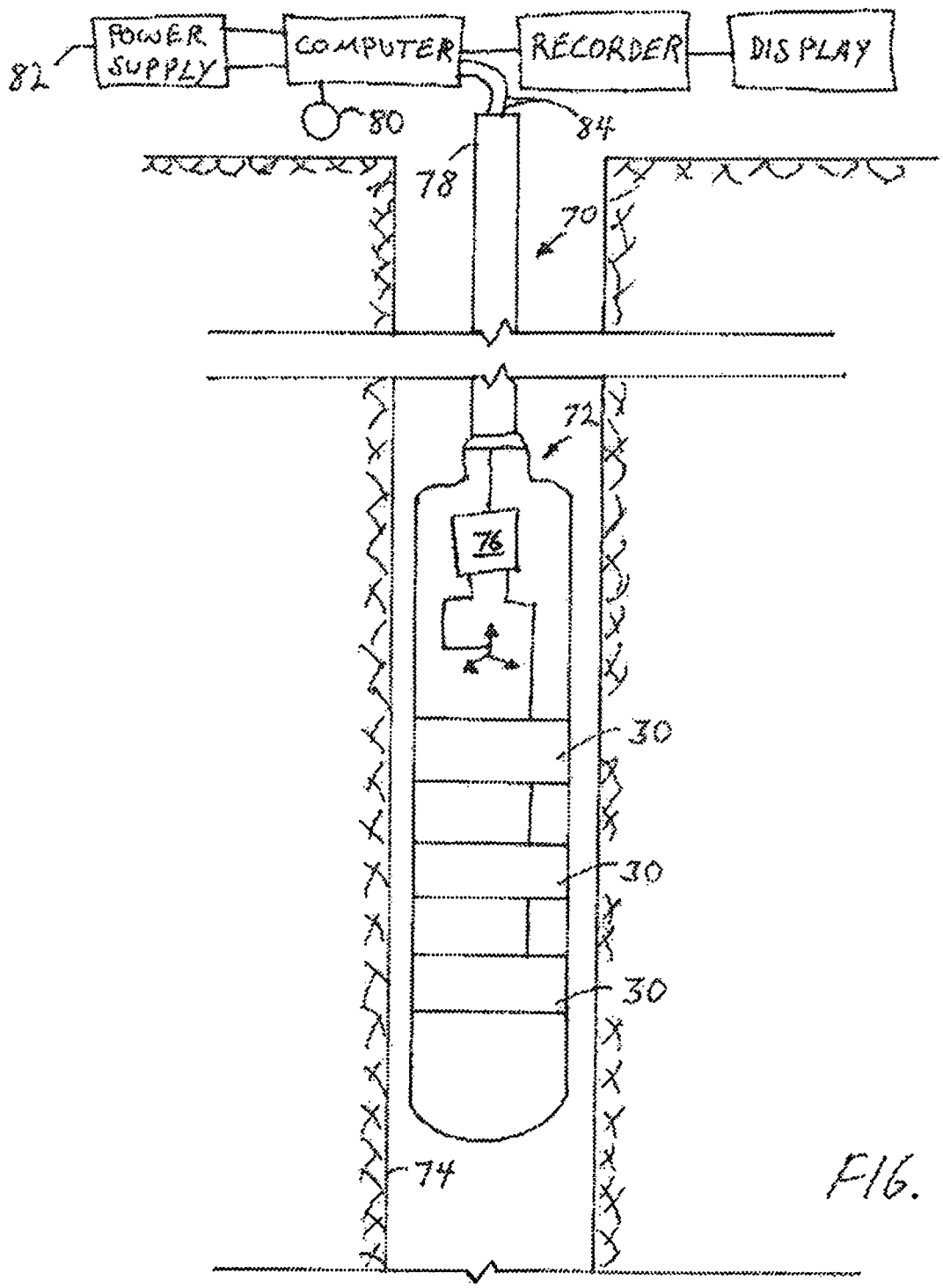
FIG. 7 is a schematic of a well logging system implemented with transducer modules in accord with aspects of the invention.

In this aspect, the body 32 is formed such that the transducer element 34 ends are covered by an overlap 38 of the material. Thus the element 34 lies slightly recessed from the outer surface of the body 32 and is preferably located close to the middle of the inside diameter and outside diameter of the body. In some aspects, an additional adhesive or potting compound may be disposed within the void holding the element 34 to provide additional sealing (not shown). The exposed element 34 surface may also be treated or finished as known in the art and as desired for the particular application. Yet other aspects of the transducer modules 30 may be implemented with a very thin overlap 38 of material or no overlap at all, such that the exposed element 34 surface is more streamlined or flush with the body 32 outer diameter, as illustrated in FIG. 7.

Figure 4:
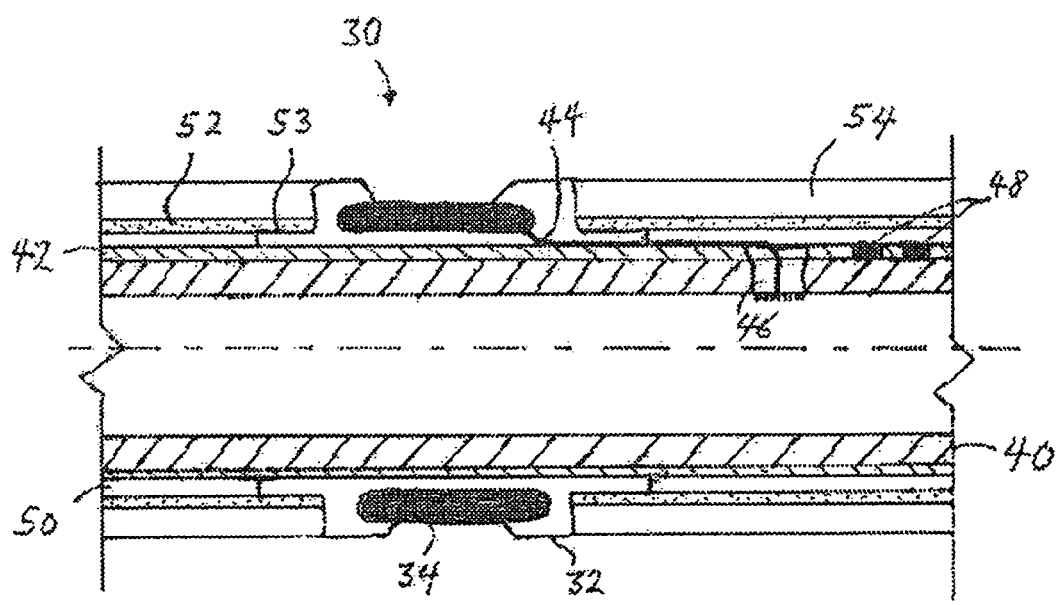
FIG. 4 is a cross-section side view of a transducer module mounted on a tubular in accord with aspects of the invention.

Turning to FIG. 4, a cross-section of another aspect of the invention is shown. In this aspect, a transducer module 30 of the invention is mounted on a mandrel 40. A non-conductive material is disposed over the outer surface of the mandrel 40 to form an electrical isolation layer 42. Useable materials for the layer 42 include any suitable materials known in the art and described herein. The layer 42 material may be disposed on the mandrel 40 in the form of a sheath that is slid over the mandrel, as a compound molded onto or set to cure on the mandrel, wrapped in tension around the mandrel, in an epoxy vacuum-filled impregnation process, or other processes as known in the art. The transducer module 30 is slid over the isolation layer 42 as a sleeve and positioned to place the element 34 in the desired position along the length of the mandrel 40.

In an aspect of the invention, the lead 44 coming out from the module 30 is coupled to a connector 46 disposed in the mandrel 40. The connector 46 can be machined into the mandrel 40 with an appropriate orifice made in the isolation layer 42 to allow for lead 44 passage. Some aspects can be implemented with the lead 44 linked to additional internal circuitry, components, and/or electronics 48, which in turn may be linked to other remote elements for signal/power transmission as desired. As known in the art, the connector 46 can be configured to couple with other connecting or interface means disposed within the bore of the mandrel 40, such as on a run-in tool as described in U.S. Pat. No. 6,577,244 (assigned to the present assignee and incorporated herein by reference in its entirety). In other aspects, the connector 46 may be an inductive coupler configured for electromagnetic coupling such as described in U.S. Pat. No. 6,577,244.

A non-conductive material is disposed over the isolation layer 42 to form a stabilization layer 50. This second layer 50 aids in holding the module 30 as well as the lead(s) 44 in place. The stabilization layer 50 can be formed of the same materials used to form the isolation layer 42 and it can be applied in a similar manner. The stabilization layer 50 is preferably disposed on the mandrel 40 such that the lead 44 is positioned under the layer. This is made easier if the lead 44 is routed to exit the module body 32 at or near the end and close to the inner surface.

A third sealing layer 52 formed of a non-conductive material is disposed over the stabilization layer 50 such that it covers the two ends of the module body 32. This sealing layer 52 can be formed from any of the materials used for the other layers and applied in a similar manner. One aspect is implemented with rubber molded over the unit as the sealing layer 52, forming a hydraulic seal. To have a better seal, it is preferable for the outer diameter at the two module 30 ends to be the same as the outer diameter of the of the stabilization layer 50. In this way, the sealing layer 52 can be bonded to the outer surfaces at the ends of the module 30 without gaps and the length of the bonded area at the ends is optimized to provide a good seal. As shown in FIG. 4, the module body 32 is preferably formed with its ends having reduced outer diameters compared to the main body outer diameter such that each end comprises a lip 53 that fits underneath the sealing layer 52 to provide improved sealing.

An outer layer 54 is formed over the sealing layer 52 to protect and further seal the module 30 assembly in place. The outer layer may be formed of any suitable material and applied as described herein and known in the art. Examples of suitable materials include, but are not limited to, non-conductive decompression-explosion resistant rubbers, PEK™ and glass, carbon fiber, KEVLAR™, fiberglass-reinforced epoxy, or any of the other materials described herein. U.S. Pat. Nos. 4,873,488, 7,023,212, 7,026,813 and U.S. Patent Publication No. 20070107896 to Finci et al. describe downhole tools implemented with composite-based/insulating exoskeletons (all four documents assigned to the present assignee and incorporated herein by reference in their entirety). As shown in FIG. 4, the lips 53 on the module ends are also covered by the outer layer 54, further improving the seal.

Figure 5:
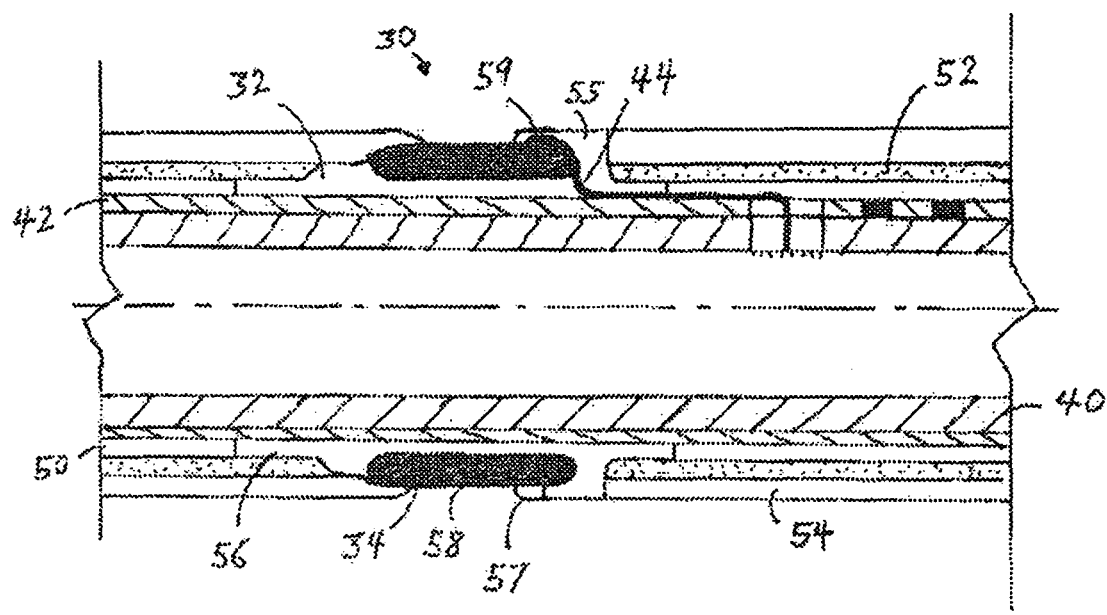
FIG. 5 is a cross-section side view of another transducer module mounted on a tubular in accord with aspects of the invention.

FIG. 5 shows another aspect of the invention. In this aspect, another transducer module 30 is mounted on a mandrel 40. A non-conductive material is disposed over the outer surface of the mandrel 40 to form an electrical isolation layer 42. A non-conductive material is disposed over the isolation layer 42 to form a stabilization layer 50. The stabilization layer 50 is preferably disposed on the mandrel 40 such that lead 44 is positioned under the layer. A third sealing layer 52 is disposed over the stabilization layer 50 such that it covers the two ends of the module body 32. One aspect may be implemented with rubber molded over the unit as the sealing layer 52, forming a hydraulic seal. The layers 42, 50, 52 can be formed of any suitable materials and disposed on the mandrel as described herein.

The module body 32 is implemented with the lead 44 routed through the body such that one end sticks out toward the outer surface to link with the element 34 and the other end comes out at, or near, an end of the body and near the inner diameter surface. The body 32 can be molded with the lead inside or the lead can be added after the body is formed (e.g., via a drilled feedthru). If molded to incorporate the lead 44, the molding along the length of the lead provides the hydraulic seal against fluid passage; otherwise the lead can be potted or sealed in the feedthru using any suitable compound.

As shown in FIG. 5, the module body 32 in this aspect is formed with only one shoulder 55 on one end. The opposite end 56 is streamlined to the outer diameter of the mandrel 40. Both module 30 ends are preferably tapered such that their outer diameters are the same as the outer diameter of the stabilization layer 50. In this way, the sealing layer 52 can be bonded to the outer surfaces at the module ends without gaps and the length of the bonded area at the ends is optimized to provide a good seal.

After the module 30 is formed, the transducer element(s) 34 is/are disposed on the middle section of the module body 32. In one aspect, the element 34 comprises a conductive sheet metal with multiple fingers wrapped around the module body 32. The sealing layer 52 is applied after the module 30 is disposed on the mandrel 40 in the desired location and may be applied before or after the element 34 is mounted. Once the element 34 is in place, the lead 44 may be coupled to the element via any suitable means known in the art (e.g., soldering, adhesives, fasteners, etc.).

To protect the element/lead coupling and to secure the element 34, a ring 57 made of a non-conductive composite material may be disposed on the mandrel 40. The ring 57 may be slipped on the mandrel 40 after the module 30 and element 34 are placed. The ring 57 may be secured in place by suitable fastener means or adhesives. An outer layer 54 is formed over the sealing layer 52 to protect and further seal the module 30 assembly in place. The outer layer 54 may be formed of any suitable material and applied as described herein. The outer layer 54 and the ring 57 can be molded/installed separately or at the same time. The window 58 that exposes the element 34 could be molded as it is, or be machined afterwards.

In another aspect, the module 30 is implemented with a conductive pin 59 (e.g., metal pin, wire) disposed within the body 32 at the shoulder 55. One end of the pin 59 sticks out toward the middle outer surface of the body 32 and the other is coupled to the lead 44. The pin 59 may be molded within the module 30 or inserted therein after the module is formed. The pin 59 may be coupled to the element 34 via any suitable means known in the art (e.g., soldering, adhesives, fasteners, etc.).

Figure 6:
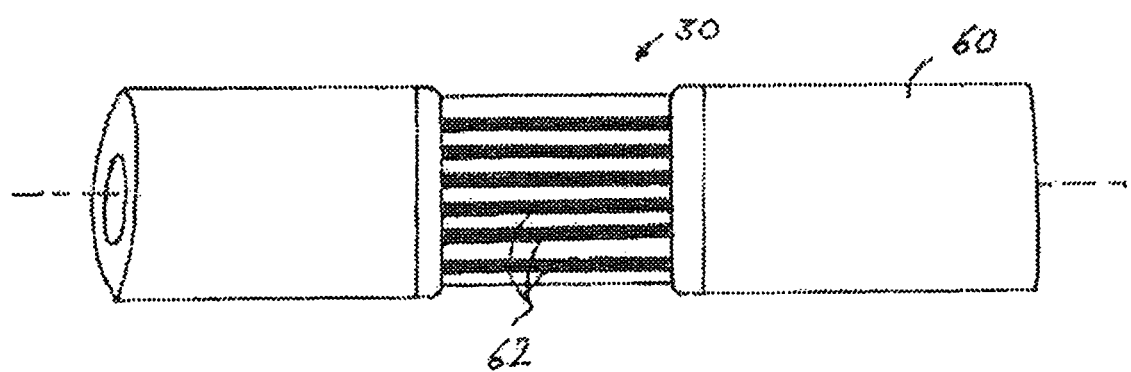
FIG. 6 shows a perspective view of a transducer module mounted on a tubular in accord with aspects of the invention.

FIG. 6 shows another aspect of the invention. A tubular 60 configured for subsurface use is equipped with a transducer module 30 of the invention. The tubular 60 can be made of metal (e.g., non-magnetic metal), a composite material, or any other suitable material as known in the art. This aspect is configured with a transducer module 30 implemented with a series of exposed element strips 62. With this configuration, the module 30 can be implemented as an electrode to obtain SFL measurements as known in the art (e.g., as described in U.S. Pat. No. 7,042,225). The internal lead(s) and linking are implemented as described herein. The tubular 60 can be any conventional tool or tubing used for subsurface operations. Examples of embodiments that can be implemented with the modules 30 of the invention include tubulars configured for subsurface disposal on armored cables (e.g., wireline, slickline), as drill collars, production tools, casing, etc. Aspects of the invention can also be implemented including shield means (not shown) disposed on the module 30 or over the module and the tubular 60 to cover the element(s) 62, providing additional protection for the elements 62, particularly in applications where the module is exposed to harsh, abrasive conditions (e.g., drilling applications). The shield means can be configured with openings leaving the element 62 surface(s) exposed to the environment as known in the art (e.g., as described in U.S. Pat. Nos. 6,566,881 and 6,299,639).

FIG. 7 shows another aspect of the invention. A logging system 70 used to acquire subsurface measurement data is equipped with a plurality of transducer modules 30 of the invention. The system 70 includes a downhole tool 72 shown disposed in a borehole 74 traversing a subterranean formation. In addition to the modules 30, the tool 72 may be equipped with other sources and sensors to perform a variety of subsurface measurements as known in the art. The tool 72 houses electronics/hardware 76 with appropriate circuitry. The tool 72 is shown supported in the borehole 74 by a logging cable 78 in the case of a wireline system or a drill string 78 in the case of a while-drilling system. With a wireline tool, the tool 72 is raised and lowered in the borehole 74 by a winch 80, which is controlled by the surface equipment 82. Logging cable or drill string 78 includes conductors 84 that connect the downhole electronics 76 with the surface equipment 82 for signal/data and control communication. Alternatively, the signals/data may be processed or recorded in the tool 72 and the processed data transmitted to the surface equipment 82. The precise forms and details of the signals produced and/or detected with the transducer modules 30 vary according to the desired measurements and applications as known in the art.

FIG. 8 shows a flow chart of a method 100 for constructing a transducer apparatus for subsurface use according to an aspect of the invention. At step 105, a transducer element 34 is disposed on a module 30 formed as a cylindrical body having an inner bore and formed of a non-conductive material as described herein. The module 30 can be fabricated or molded including the transducer element(s) 34 or the element(s) can be added after its fabrication as described herein. The element 34 is disposed such that a surface of the element is exposed along the exterior of the module body 32 and the element is linked to a lead 44 routed through the body to exit near the inner bore of the body according to the techniques described herein. At step 110, the module 30 is disposed on a tubular 60 configured for subsurface disposal. The tubular is passed through the inner bore of the module body 32 such that the body surrounds a section of the tubular as described herein. At step 115, the ends of the module body 32 are covered with a material to form a hydraulic seal according to the techniques disclosed herein.

The disclosed techniques provide notable advantages over conventional source and sensor configurations for subsurface use. The disclosed aspects provide improved seals between the exposed transducer element and the internal electronics and the layer materials. These designs reduce sources of leakage existing in conventional configurations. For instance, since the element lead does not need to go through one or more layers like conventional configurations, a hydraulic seal can be accomplished by a single rubber molding process without repairing and patching after digging wires and removing extra pieces, thus improving the quality of the seal. Furthermore, the transducer modules of the invention can be implemented for use on practically any type of tubular. For subsurface applications, the modules can be disposed on the various tubular means of conveyance as known in the art, including, but not limited to, wireline, slickline, LWD/MWD, LWT, run-in tools, production tubing and casing.

While the present disclosure describes specific aspects of the invention, numerous modifications and variations will become apparent to those skilled in the art after studying the disclosure, including use of equivalent functional and/or structural substitutes for elements described herein. For example, aspects of the invention can also be implemented with the transducer modules 30 disposed on protruding sections that extend outward from the outer surface of the tubular (also known as stabilizer blades). Yet other aspects may be implemented with the modules 30 including elements adapted for telemetry applications (not shown). All such similar variations apparent to those skilled in the art are deemed to be within the scope of the invention as defined by the appended claims. For the purposes of this specification it will be clearly understood that the word "comprising" means "including but not limited to", and that the word "comprises" has a corresponding meaning.

What is claimed is:

1. A transducer system for subsurface use, comprising:
a tubular configured for subsurface disposal;
a cylindrical body formed of a non-conductive material having walls and an inner bore forming a closed surface of revolution with open ends;
the cylindrical body having a transducer element disposed thereon such that only a surface of the element is exposed along the exterior of the body, the exposed element surface being recessed from the outer surface of the body;
the cylindrical body formed with its ends having reduced outer diameters compared to the main body outer diameter such that each end comprises a lip;
the transducer element linked to a lead routed through the cylindrical body and exiting near the inner bore of the body, a segment of the lead being sealed within a wall of the cylindrical body;
the tubular disposed within the inner bore of the cylindrical body such that the body surrounds a section of the tubular;
a connector disposed on the tubular to couple with the lead for signal or power transmission between the transducer element and remote electronics; and
at least one layer of a non-conductive material disposed on the outer surface of the tubular over the lip at each end of the cylindrical body to form a hydraulic seal.

2. A transducer apparatus for subsurface use, comprising:
a tubular configured for subsurface disposal;
a cylindrical body having an inner bore and formed of a non-conductive material;
the tubular disposed within the inner bore of the cylindrical body such that the body surrounds a section of the tubular;
the cylindrical body having a transducer element disposed thereon such that only a surface of the element is exposed along the exterior of the body;
the transducer element being linked to a lead routed through the cylindrical body and exiting near the inner bore of the body; and
the ends of the cylindrical body being covered with a material to form a hydraulic seal.

3. The apparatus of claim 2, wherein the cylindrical body comprises walls forming a single surface of revolution having open ends to fit as a sleeve over the tubular.

4. The apparatus of claim 3, wherein the transducer element is disposed on the cylindrical body such that the exposed element surface is recessed from the outer surface of the body.

5. The apparatus of claim 3, further comprising a non-conductive material disposed on the outer surface of the tubular to form a first layer between the tubular and the cylindrical body.

6. The apparatus of claim 5, further comprising a non-conductive material disposed over the first layer of non-conductive material to cover the lead, forming a second layer over the tubular.

7. The apparatus of claim 6, wherein the material covering the ends of the cylindrical body forms a third layer over the first and second layers.

8. The apparatus of claim 7, further comprising a non-conductive material disposed over the ends of the cylindrical body to form a fourth layer over the first, second and third layers disposed on the tubular.

9. The apparatus of claim 8, wherein the cylindrical body is formed with its ends having reduced outer diameters compared to the main body outer diameter such that each end comprises a lip to fit underneath at least one of the second, third or fourth layers.

10. The apparatus of claim 9, further comprising a connector disposed on the tubular to couple with the lead for signal or power transmission between the transducer element and remote electronics.

11. The apparatus of claim 9, further comprising a ring disposed on the cylindrical body over the transducer element.

12. The apparatus of claim 3, wherein a segment of the lead is sealed within a wall of the cylindrical body.

13. A method for constructing a transducer for subsurface use, comprising:

disposing a transducer element on a cylindrical body having an inner bore and formed of a non-conductive material, the element disposed such that only a surface of the element is exposed along the exterior of the body and linked to a lead routed through the body to exit near the inner bore of the body;

disposing the cylindrical body on a tubular configured for subsurface disposal, the tubular passing through the inner bore of the body such that the body surrounds a section of the tubular; and covering the ends of the cylindrical body with a material to form a hydraulic seal.

14. The method of claim 13, wherein the cylindrical body comprises walls forming a single surface of revolution having open ends to fit as a sleeve over the tubular.

15. The method of claim 14, comprising disposing the transducer element on the cylindrical body such that the exposed element surface is recessed from the outer surface of the body.

16. The method of claim 14, further comprising disposing a non-conductive material on the outer surface of the tubular to form a first layer between the tubular and the cylindrical body.

17. The method of claim 16, farther comprising disposing a non-conductive material over the first layer of non-conductive material to cover the lead, forming a second layer over the tubular.

18. The method of claim 17, wherein covering the ends of the cylindrical body with a material comprises forming a third layer over the first and second layers.

19. The method of claim 18, further comprising disposing a non-conductive material over the ends of the cylindrical body to form a fourth layer over the first, second and third layers disposed on the tubular.

20. The method of claim 19, wherein the cylindrical body is formed with its ends having reduced outer diameters compared to the main body outer diameter such that each end comprises a lip to fit underneath at least one of the second, third or fourth layers.

21. The method of claim 20, further comprising disposing a ring on the cylindrical body over the transducer element.

22. The method of claim 14, wherein a segment of the lead is sealed within a wall of the cylindrical body.

* * * * *